(12) United States Patent
Zhu et al.

(10) Patent No.: US 8,977,905 B2
(45) Date of Patent: Mar. 10, 2015

(54) METHOD AND SYSTEM FOR DETECTING ABNORMALITY OF NETWORK PROCESSOR

(75) Inventors: Yin Zhu, Shenzhen (CN); Yirong Wu, Shenzhen, Guangdong (CN)

(73) Assignee: ZTE Corporation, Shenzhen (CN)

( * ) Notice: Subject to any disclaimer, the term of this patent is extended or adjusted under 35 U.S.C. 154(b) by 208 days.

(21) Appl. No.: 13/881,875

(22) PCT Filed: Sep. 13, 2011

(86) PCT No.: PCT/CN2011/079588
§ 371 (c)(1),
(2), (4) Date: Apr. 26, 2013

(87) PCT Pub. No.: WO2012/055303
PCT Pub. Date: May 3, 2012

(65) Prior Publication Data
US 2013/0212436 A1 Aug. 15, 2013

(30) Foreign Application Priority Data

Oct. 29, 2010 (CN) .......................... 2010 1 0526967

(51) Int. Cl.
*G06F 11/00* (2006.01)
*G06F 11/30* (2006.01)
*G06F 11/07* (2006.01)

(52) U.S. Cl.
CPC ........ *G06F 11/3024* (2013.01); *G06F 11/0772* (2013.01); *G06F 11/0715* (2013.01); *G06F 11/0763* (2013.01)
USPC ........................................... 714/35; 714/38.1

(58) Field of Classification Search
CPC ............ G06F 11/3644; G06F 11/0763; G06F 11/3024; G06F 11/0721; G06F 11/0772; G06F 11/0715
See application file for complete search history.

(56) References Cited

U.S. PATENT DOCUMENTS 4,710,928 A * 12/1987 Ueda .............................. 714/25
7,424,666 B2   9/2008 Chandwani
7,558,986 B2 * 7/2009 Abe .............................. 714/38.1
2007/0088974 A1   4/2007 Chandwani
2012/0226946 A1 * 9/2012 Arndt et al. .................. 714/38.1

FOREIGN PATENT DOCUMENTS

| CN | 1641600 A | 7/2005 |
| CN | 101166124 A | 4/2008 |
| CN | 101309184 A | 11/2008 |
| CN | 101645035 A | 2/2010 |
| CN | 101976217 A | 2/2011 |

OTHER PUBLICATIONS

International Search Report in international application No. PCT/CN2011/079588, mailed on Nov. 24, 2011.
English Translation of the Written Opinion of the International Search Authority in international application No. PCT/CN2011/079588, mailed on Nov. 24, 2011.

* cited by examiner

*Primary Examiner* — Scott Baderman
*Assistant Examiner* — Jason Bryan
(74) *Attorney, Agent, or Firm* — Oppedahl Patent Law Firm LLC

(57) ABSTRACT

The disclosure discloses a method and a system for detecting an abnormality of a network processor. The method comprises the following steps: an abnormality detection operation code is added into an execution flow of each thread in a network processor, and the network processor sets a flag bit corresponding to a current thread in an abnormality protection flag data area in a shared memory to a first flag when executing the abnormality detection operation code in the current thread; and when a period of a timer is expire, a coprocessor detects all the flag bits in the abnormality protection flag data area in the shared memory, determines that a thread corresponding to a flag bit which is not the first flag is abnormal when detecting that not all the flag bits are the first flag, and sets all the flag bits to a second flag when detecting that all the flag bits are the first flag. Through the disclosure, the abnormality of a thread can be detected timely and efficiently, so that the failure detection capability of the network device using the network processor as a core unit at run time is improved without influencing the forwarding performance and service processing flow of the network processor.

16 Claims, 3 Drawing Sheets

METHOD AND SYSTEM FOR DETECTING ABNORMALITY OF NETWORK PROCESSOR

TECHNICAL FIELD

The disclosure relates to the technical field of communications, in particular to a method and a system for detecting an abnormality of a network processor.

BACKGROUND

A Net Processor (NP) is an application specific instruction processor in the field of network application, and also a software programmable component for data packet processing having architecture characteristics and/or specific circuits. In the current data communication industry, the net processor is almost used as a core component for traffic forwarding and service processing in mainstream switches and routers. The stable running of the network processor is the foundation for guaranteeing the efficient traffic forwarding of data communication products and also the basic condition of secure and stable service processing.

In the recent years, the demand for the service processing capability of the network processor grows continuously, the service implementation solution is increasingly complex, and the requirement on the forwarding performance of the network processor is higher and higher along with increasingly rich network services and more and more complex network applications, resulting in a higher abnormality possibility of the network processor at run time inevitably. In various failures, the crash abnormality of the network processor caused by software and hardware accounts for a large proportion, mainly including local endless loop of software program caused by abnormal crash of processor hardware and hardware problem, such as program endless loop caused by abnormality in accessing peripherals. Such failures are very harmful to the services running in the networks, and large packet loss, long-term disconnection, even network paralysis will occur if such failures are not handled in time, so as to cause large economic loss to operators and network users inevitably.

At present, device manufacturers in this industry mostly rely on manual investigation to solve such problems in the running process of the network processor, consuming a lot of manpower, materials and capitals, increasing the operation and maintenance cost and adding extra burden to the enterprises. To reduce the equipment operation and maintenance expense for the enterprises, it is urgent to provide a technical scheme for detecting the software and hardware crash abnormality of the network processor in order that the failure can be detected automatically at the first time by the processor software.

CN patent application (application number: 200410015057.5, publication number: CN1641600) discloses a method for forecasting a crash probability of an electronic device, in which whether the status of a system is stable or not is judged mainly by comparing a pointer value counting the times of executing debugging by the system with a pre-created system status forecasting table for forecasting the execution status of the system. This detection method is mainly focused on the forecasting for "crash", and a forecasting table needs to be created in advance. However, the service processing of the network processor is often complicated, and the status of the system is totally different and difficult to remain the same during the processing of different services, so this method is difficult to apply to detecting the crash abnormality of the network processor.

CN patent application (application number: 200910169532.7, publication number: CN101645035) discloses a method for detecting a running position of a program code and an embedded system, in which, a program code of a predetermined output instruction is inserted by running, the output instruction contains the position information of the predetermined output instruction in the program code; and when the predetermined output instruction runs, the position information is output to an external interface which controls the position of the predetermined output instruction in the program code to be displayed on a light-emitting diode thereof according to the position information. This solution is focused on the detection for the running position of a sequence code, and an external light-emitting diode is required for display. In the hardware networking of current forwarding devices using the network processor as the core, the network processor is not connected with such peripheral as the light-emitting diode, and the display of the external light-emitting diode is impossible due to extremely high running frequency of the network processor and very fast update of the program position.

SUMMARY

To overcome the defects of the conventional art, the technical problem to be solved by the disclosure is to disclose a method and a system for detecting an abnormality of a network processor to improve the failure detection capability of a network device using the network processor as a core unit at run time.

To solve the technical problem above, the disclosure provides a method for detecting an abnormality of a network processor, which includes:

adding an abnormality detection operation code into an execution flow of each thread in a network processor, and setting a flag bit corresponding to a current thread in an abnormality protection flag data area in a shared memory to a first flag by the network processor when executing the abnormality detection operation code in the current thread; and when a period of a timer is expire, detecting, by a coprocessor, all the flag bits in the abnormality protection flag data area in the shared memory, determining that a thread corresponding to a flag bit which is not the first flag is abnormal when detecting that not all the flag bits are the first flag, and setting all the flag bits to a second flag when detecting that all the flag bits are the first flag.

Furthermore, the step of adding an abnormality detection operation code into an execution flow of each thread in a network processor may include: adding the abnormality detection operation code into a public flow of the execution flow of each thread in the network processor; or, adding the abnormality detection operation code into a branch flow of the execution flow of each thread in the network processor.

Furthermore, the network processor may be a single core network processor, and the step of setting a flag bit corresponding to a current thread in an abnormality protection flag data area in a shared memory to a first flag by the network processor when executing the abnormality detection operation code in the current thread may include:

reading, by the network processor, a status register in the network processor and extracting a thread number of the current thread when executing the abnormality detection operation code in the current thread;

computing, by the network processor, a flag bit corresponding to the current thread according to the thread number of the current thread and a start address of the abnormality protection flag data area in the shared memory; and setting, by the network processor, the flag bit corresponding to the current thread to the first flag.

Furthermore, the network processor may be a multi-core network processor, and the step of setting a flag bit corresponding to a current thread in an abnormality protection flag data area in a shared memory to a first flag by the network processor when executing the abnormality detection operation code in the current thread may include:

reading, by the network processor, a status register in the network processor and extracting a core number of the processor of the current thread and a thread number of the current thread when executing the abnormality detection operation code in the current thread;

computing, by the network processor, a serial number of the current thread of all the threads in the network processor according to the core number of the processor and the thread number of the current thread;

computing, by the network processor, a flag bit corresponding to the current thread according to the serial number of the current thread of all the threads in the network processor and a start address of the abnormality protection flag data area in the shared memory; and setting, by the network processor, the flag bit corresponding to the current thread to the first flag.

Furthermore, setting the period of the timer, $T_{timer\ period}$, according to a following formula:

$$T_{timer\ period} \geq \max[1/f_{network\ processor\ frequency} * T_{average\ instruction\ period} * N_{instruction\ line} + T_{peripheral\ access\ time}]$$

where $f_{network\ processor\ frequency}$ represents frequency of the network processor during a normal service; $T_{average\ instruction\ period}$ represents an average period of the network processor executing each instruction during a normal service; $N_{instruction\ line}$ represents a line number of instructions in a program; and $T_{peripheral\ access\ time}$ represents time of input/output operation in the program in a worst case.

The disclosure further provides a system for detecting an abnormality of a network processor, which includes: a network processor, a coprocessor and a shared memory, wherein:

the network processor, into an execution flow of each thread of which an abnormality detection operation code is added, is configured to set a flag bit corresponding to a current thread in an abnormality protection flag data area in the shared memory to a first flag when executing the abnormality detection operation code in the current thread;

the coprocessor is configured to, when a period of a timer is expire, detect all the flag bits in the abnormality protection flag data area in the shared memory, determine that a thread corresponding to a flag bit which is not the first flag is abnormal when detecting that not all the flag bits are the first flag, and set all the flag bits to a second flag when detecting that all the flag bits are the first flag; and a shared memory is configured to store data written by the network processor and the coprocessor for access of the coprocessor.

Furthermore, the abnormality detection operation code may be added into a public flow of the execution flow of each thread in the network processor; or, the abnormality detection operation code may be added into a branch flow of the execution flow of each thread in the network processor.

Furthermore, the network processor may be a single core network processor, which includes:

a first reading module, which is configured to read a status register in the network processor and extract a thread number of the current thread when executing the abnormality detection operation code in the current thread;

a first computation module, which is configured to compute a flag bit corresponding to the current thread according to the thread number of the current thread and a start address of the abnormality protection flag data area in the shared memory; and a first writing module, which is configured to set the flag bit corresponding to the current thread to the first flag.

Furthermore, the network processor may be a multi-core network processor, which includes:

a second reading module, which is configured to read a status register in the network processor and extract a core number of the processor of the current thread and a thread number of the current thread when executing the abnormality detection operation code in the current thread;

a second computation module, which is configured to compute a serial number of the current thread of all the threads in the network processor according to the core number of the processor and the thread number of the current thread;

a third computation module, which is configured to compute a flag bit corresponding to the current thread according to the serial number of the current thread of all the threads in the network processor and a start address of the abnormality protection flag data area in the shared memory; and a second writing module, which is configured to set the flag bit corresponding to the current thread to the first flag.

Furthermore, the period of the timer, $T_{timer\ period}$, may be set according to a following formula:

$$T_{timer\ period} \geq \max[1/f_{network\ processor\ frequency} * T_{average\ instruction\ period} * N_{instruction\ line} + T_{peripheral\ access\ time}]$$

where $f_{network\ processor\ frequency}$ represents frequency of the network processor during a normal service; $T_{average\ instruction\ period}$ represents an average period of the network processor executing each instruction during a normal service; $N_{instruction\ line}$ represents a line number of instructions in a program; and $T_{peripheral\ access\ time}$ represents time of input/output operation in the program in a worst case.

According to the method and the system for detecting the abnormality of a network processor provided by the disclosure, the abnormality of a thread can be detected timely and efficiently according to the characteristics of the software flow of the network processor, so that the failure detection capability of the network device using the network processor as a core unit at run time is greatly improved without influencing the forwarding performance and service processing flow of the network processor.

DETAILED DESCRIPTION

Figure 1:
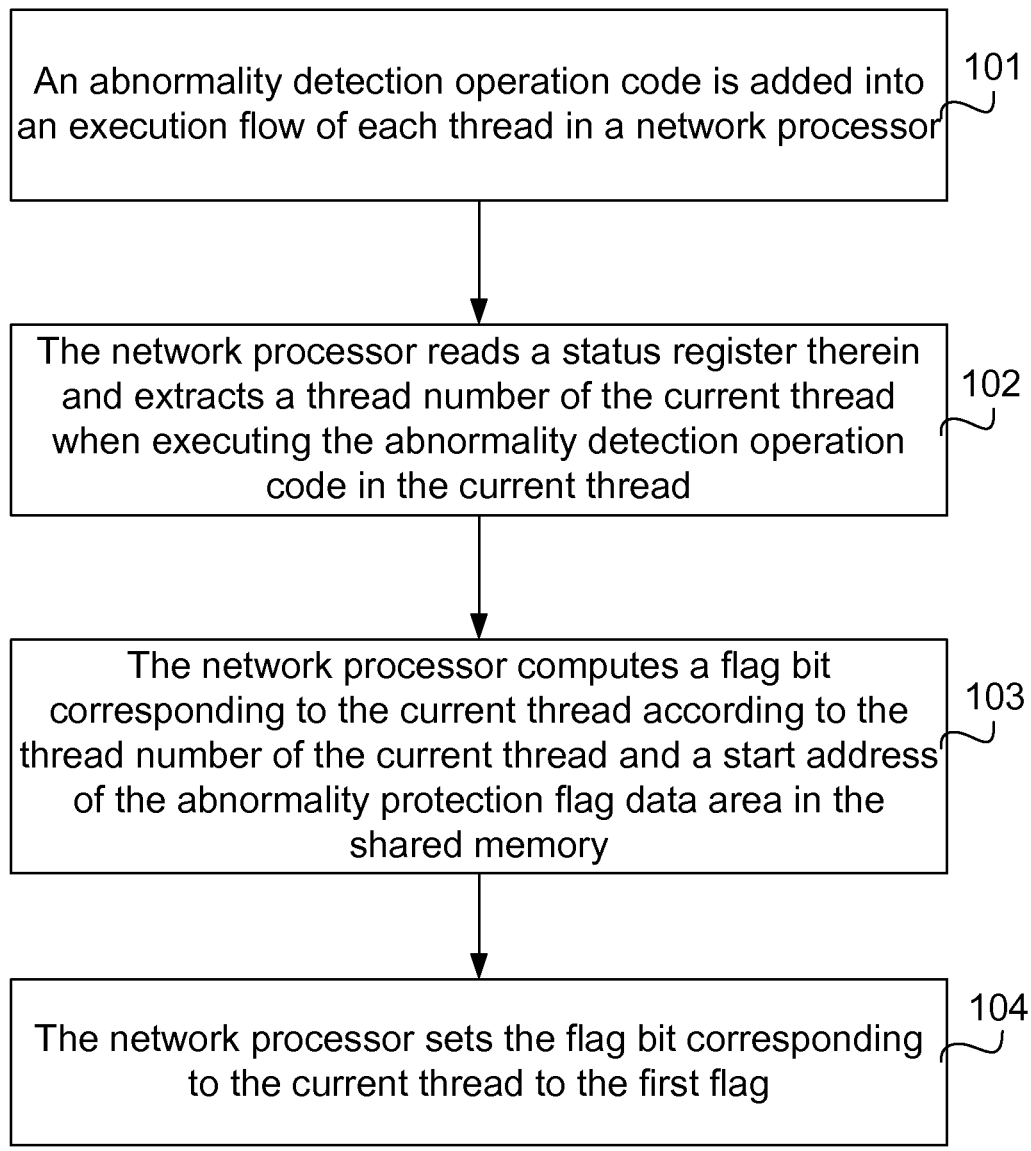
FIG. 1 is a processing flowchart of a network processor in an embodiment of a method for detecting an abnormality of a network processor provided by the disclosure.

The disclosure provides a method and a system for detecting an abnormality of a network processor according to the characteristics of hardware and software flows of a typical forwarding device using the network processor as a core. The core idea is to add an abnormality detection operation code into an execution flow of each thread in a network processor in advance, and the network processor and a coprocessor share a shared memory. When executing the abnormality detection operation code in a current thread, the network processor sets a flag bit corresponding to the current thread in an abnormality protection flag data area in the shared memory to a first flag; when a period of a timer is expire, the coprocessor detects all the flag bits in the abnormality protection flag data area in the shared memory, determines that a thread corresponding to a flag bit which is not the first flag is abnormal if detecting that not all the flag bits are the first flag, and sets all the flag bits to a second flag if detecting that all the flag bits are the first flag. In the disclosure, the abnormality of a thread can be detected timely and efficiently according to the characteristics of the software flow of the network processor, so that the failure detection capability of the network device using the network processor as a core unit at run time is greatly improved without influencing the forwarding performance and service processing flow of the network processor.

In the following embodiments, an exemplary description is made mainly for a crash abnormality, but the abnormality of the disclosure is not limited thereto.

The network processor is a core module of the disclosure and also an object for abnormality detection. Related programs for implementing traffic forwarding and network service run in the network processor. In the disclosure, the network processor specifically sets a flag bit corresponding to the current thread in an abnormality protection flag data area in the shared memory to a first flag mainly according to status information of each thread fed back by software at run time. The status information fed back by the network processor is hereinafter called crash information.

The coprocessor may usually be a chip like an ARM with an operating system running thereon and responsible for managing a memory, loading a network processor source code, interrupting response, etc. The main frequency of the coprocessor is often far below that of the network processor. In the disclosure, the coprocessor is mainly responsible for monitoring the crash information fed back by the network processor, and performing corresponding processing when finding that the status is abnormal.

The shared memory may be an accessible memory area in the network processor chip, such as a Static Random Access Memory (SRAM), a Dynamic Random Access Memory (DRAM), a Double Data Rate (DDR) memory or other memory units. The shared memory can be shared by the network processor and the coprocessor. The shared memory in the disclosure is mainly for storing the crash information fed back by the network processor for access of the coprocessor.

The technical scheme of the disclosure is described below with reference to the drawings and preferred embodiments in detail.

FIG. 1 is a processing flowchart of a network processor in an embodiment of a method for detecting an abnormality of a network processor provided by the disclosure, as shown in FIG. 1, which includes the following steps:

Step 101: An abnormality detection operation code is added into an execution flow of each thread in a network processor.

To achieve higher forwarding performance, the network processor usually has many threads running in parallel, and each thread can run independently to process the network traffic in stage. Different tasks are processed in each thread, but the software execution flow of each thread is substantially designed according to the unlimited loop of the service processing due to the continuous needs of traffic forwarding and service processing, i.e., when a thread is initialized, its function is realized by the continuous loop of packet receiving, packet processing, packet sending and packet receiving, so that each thread substantially has a public flow independent of the service processing, for example, the flow of packet receiving or packet sending. In the actual operation, the public flow must be executed as least once. Therefore, in the embodiment, the abnormality detection operation code can be added into the public flow of the execution flow of each thread in the network processor.

Some threads do not have the public flow because of functional requirements, so the abnormality detection operation code can be added into a branch flow of the execution flow of these threads in the network processor.

Of course, in the embodiment, the abnormality detection operation code can also be added into the branch flow of the execution flow of each thread in the network processor directly.

The abnormality detection operation code is added into the execution flow of each thread in the network processor to ensure that the abnormality detection operation code can run periodically in the thread during the normal execution; and the abnormality detection operation code cannot be executed if crash abnormality occurs in the thread, such as endless loop, unresponsive signal and suspension at run time.

Step 102: The network processor reads a status register therein and extracts a thread number of the current thread when executing the abnormality detection operation code in the current thread.

Step 103: The network processor computes a flag bit corresponding to the current thread according to the thread number of the current thread and a start address of the abnormality protection flag data area in the shared memory.

Step 104: The network processor sets the flag bit corresponding to the current thread to the first flag.

In this embodiment, the shared memory needs to create an area (i.e., abnormality protection flag date area) for the interaction of crash information between the network processor and the coprocessor. The crash information of each thread in the network processor corresponds to a specific flag bit in the area one by one. For example, when the network processor executes the abnormality detection operation code in the current thread, it means that the current thread is running normally, and the network processor sets the flag bit corresponding to the current thread to 1, that is, setting the flag bit to 1 means that the thread corresponding to the flag bit is running normally. Also, when the loop is completed in the thread once, the corresponding flag bit is set to 1 in the shared memory once; however, when crash abnormality occurs in the thread, the program cannot execute the abnormality detection operation code, and the flag bit cannot be set to 1.

Steps 102 to 104 are suitable for the network processor which is a single core network processor, and if the network processor is a multi-core network processor, steps 102 to 104 can be replaced as: the network processor reads a status register therein and extracts a core number of the processor of the current thread and a thread number of the current thread when executing the abnormality detection operation code in the current thread; the network processor computes a serial number of the current thread of all the threads in the network processor according to the core number of the processor and the thread number of the current thread; the network processor computes a flag bit corresponding to the current thread according to the serial number of the current thread of all the threads in the network processor and a start address of the abnormality protection flag data area in the shared memory;

and the network processor sets the flag bit corresponding to the current thread to the first flag.

Figure 2:
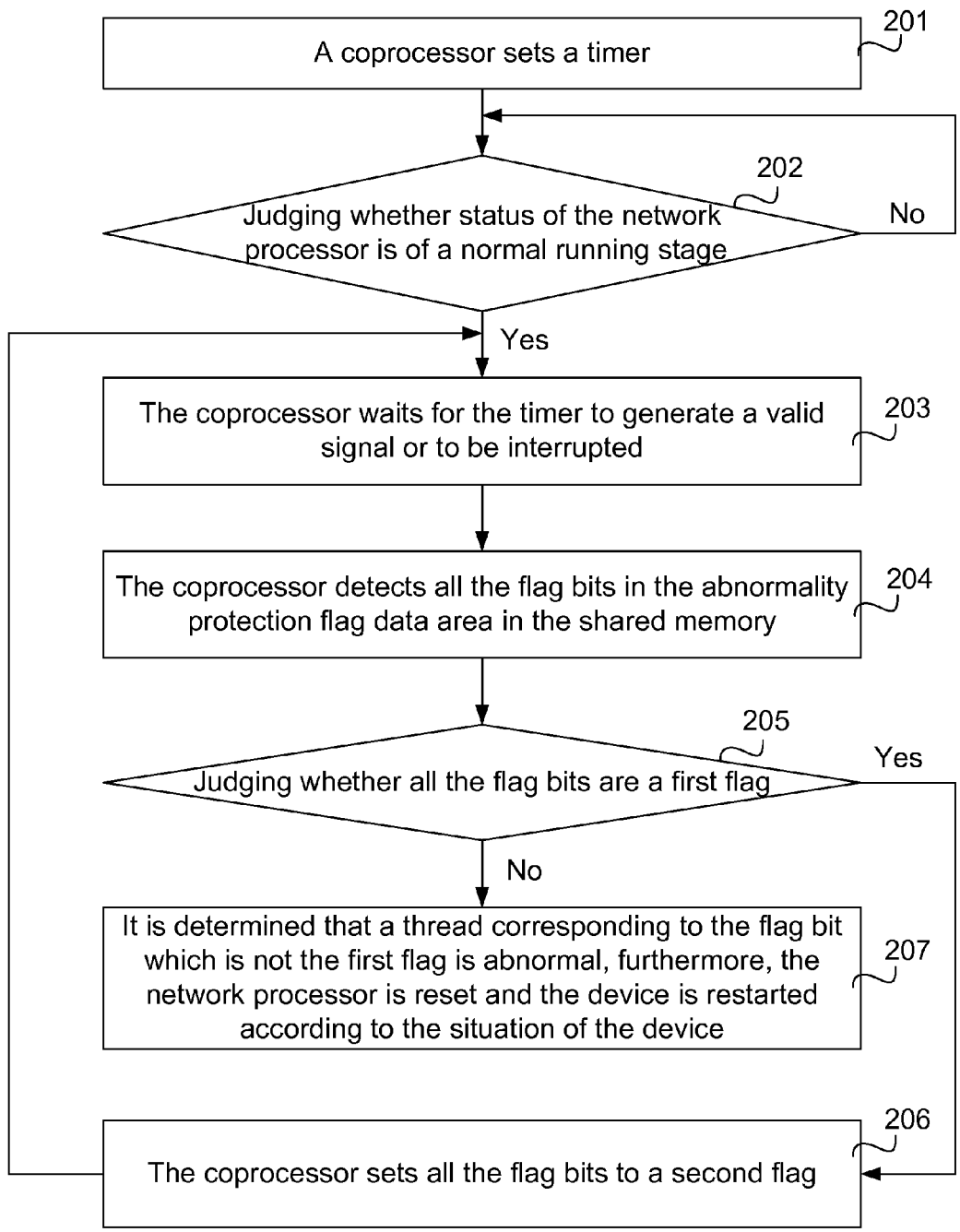
FIG. 2 is a processing flowchart of a coprocessor in an embodiment of a method for detecting an abnormality of a network processor provided by the disclosure.

FIG. 2 is a processing flowchart of a coprocessor in an embodiment of a method for detecting an abnormality of a network processor provided by the disclosure, as shown in FIG. 2, which includes the following steps:

Step 201: A coprocessor sets a timer.

The period of the timer, $T_{timer\ period}$, of the timer can be set according to the following formula:

$$T_{timer\ period} >= \max[1/f_{network\ processor\ frequency} * T_{average\ instruction\ period} * N_{instruction\ line} + T_{peripheral\ access\ time}]$$

where $f_{network\ processing\ frequency}$ represents frequency of the network processor during a normal service; $T_{average\ instruction\ period}$ represents an average period of the network processor executing each instruction during a normal service; $N_{instruction\ line}$ represents a line number of instructions in a program; and $T_{peripheral\ access\ time}$ represents time of input/output operation in the program in the worst case.

To reduce the misjudgement probability on the crash abnormality of the network processor, the period of the timer cannot be set too short. Meanwhile, to guarantee the detection sensitivity of the crash abnormality for the system, in the disclosure, the period of the timer, $T_{timer\ period}$, is greater than or equal to the maximum value computed in each thread so as to make sure no misdetection for the crash abnormality.

At the beginning of setting the timer, an abnormality protection flag data area in the shared memory need to be initialized and set to 0.

Step 202: Judging whether status of the network processor is of a normal running stage, if so, step 203 is executed; otherwise, no operation is executed till the network processor is in the normal running stage.

Step 203: The coprocessor waits for the timer to generate a valid signal or to be interrupted.

In this embodiment, it is indicated that the period of the timer is expire if the timer generates a valid signal or is interrupted.

Step 204: The coprocessor detects all the flag bits in the abnormality protection flag data area in the shared memory when receiving that the timer generates a valid signal or is interrupted.

In this embodiment, when receiving that the timer generates a valid signal or is interrupted, the coprocessor can judge whether a crash detection function is enabled at first, specifically, judge whether a flag of the crash detection function is valid; if so, it further detects the abnormality protection flag data area in the shared memory, otherwise step 203 is executed again.

Step 205: Judging whether all the flag bits are a first flag; if so, step 206 is executed; otherwise, step 207 is executed.

Referring to the example above, the coprocessor judges whether all the flag bits are 1; if so, it means that all the threads are running normally; otherwise, it means that a thread corresponding to a flag bit which is not 1 is abnormal.

Step 206: The coprocessor sets all the flag bits to a second flag, and step 203 is executed again.

Referring to the example above, the coprocessor sets all the flag bits to 0, and also clears the abnormality protection flag data area in the shared memory.

Step 207: It is determined that a thread corresponding to the flag bit which is not the first flag is abnormal, and furthermore, the network processor is reset and the device is restarted according to the situation of the device.

In this embodiment, the coprocessor clears the abnormality protection flag data area during the initialization; after the system runs normally, the abnormality protection flag data area in the shared memory is read regularly; in the case of normal running, the flag bit corresponding to each thread in the abnormality protection flag data area read by the coprocessor is set to 1, which means that each thread is running normally; thereafter, the abnormality protection flag data area is cleared again to wait for the next setting of the thread of the network processor; when some flag bits in the abnormality protection flag data area read by the coprocessor are still set to 0, which means that this thread has been in the status of crash abnormality; and at this moment, the coprocessor can recover this thread from the crash status and acquire the failure information by resetting the network processor, restarting the device, etc.

Figure 3:
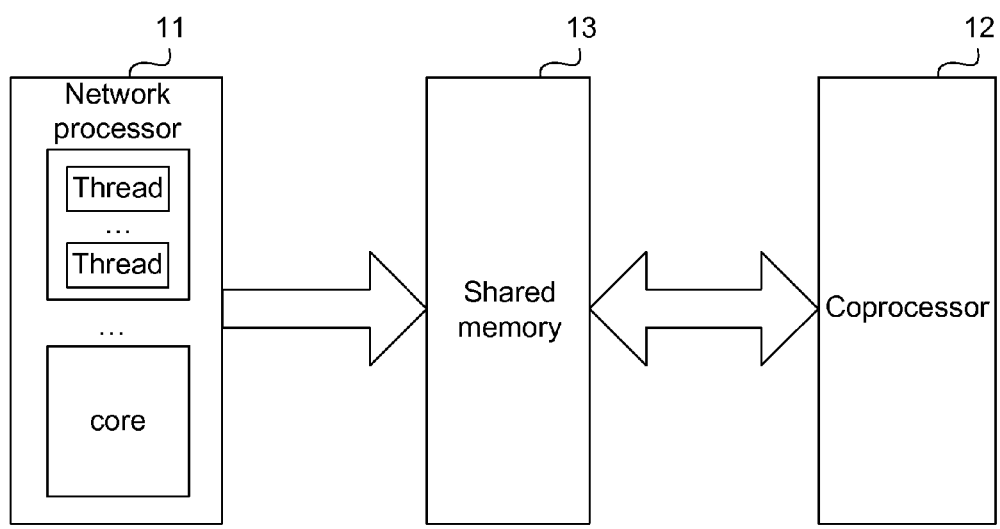
FIG. 3 is a structure diagram of a system for detecting an abnormality of a network processor provided by the disclosure in an embodiment.

FIG. 3 is a structure diagram of a system for detecting an abnormality of a network processor provided by the disclosure in an embedment. As shown in FIG. 3, the system includes: a network processor 11, a coprocessor 12 and a shared memory 13, wherein the network processor 11 has many threads running in parallel, and an abnormality detection operation code is added into an execution flow of each thread; the network processor 11 is configured to set a flag bit corresponding to a current thread in an abnormality protection flag data area in the shared memory 13 to a first flag when executing the abnormality detection operation code in the current thread;

the coprocessor 12 is configured to, when a period of a timer is expire, detect all the flag bits in the abnormality protection flag data area in the shared memory 13, determine that a thread corresponding to a flag bit which is not the first flag is abnormal if detecting that not all the flag bits are the first flag, and set all the flag bits to a second flag if detecting that all the flag bits are the first flag; and the shared memory 13 is configured to store data written by the network processor 11 and the coprocessor 12 for access of the coprocessor 12.

The abnormality detection operation code can be added into a public flow of the execution flow of each thread in the network processor 11; or, the abnormality detection operation code is added into a branch flow of the execution flow of each thread in the network processor 11.

The network processor 11 as shown in FIG. 3 is a single core network processor. Furthermore, the network processor 11 may include: a first reading module, which is configured to read a status register in the network processor and extract a thread number of the current thread when executing the abnormality detection operation code in the current thread; a first computation module, which is configured to compute a flag bit corresponding to the current thread according to the thread number of the current thread and a start address of the abnormality protection flag data area in the shared memory; and a first writing module, which is configured to set the flag bit corresponding to the current thread to the first flag.

Optionally, the network processor may also be a multi-core network processor, then the network processor 11 may include: a second reading module, which is configured to read a status register in the network processor and extract a core number of the processor of the current thread and a thread number of the current thread when executing the abnormality detection operation code in the current thread; a second computation module, which is configured to compute a serial number of the current thread of all the threads in the network processor according to the core number of the processor and the thread number of the current thread; a third computation module, which is configured to compute a flag bit corresponding to the current thread according to the serial number of the current thread of all the threads in the network processor and a start address of the abnormality protection flag data area in the shared memory; and a second writing module, which is configured to set the flag bit corresponding to the current thread to the first flag.

The period of the timer, $T_{timer\ period}$, of the coprocessor 12 can be set according to the following formula:

$$T_{timer\ period} >= \max[1/f_{network\ processor\ frequency} * T_{average\ instruction\ period} * N_{instruction\ line} + T_{peripheral\ access\ time}]$$

where $f_{network\ processing\ frequency}$ represents frequency of the network processor during a normal service; $T_{average\ instruction\ period}$ represents an average period of the network processor executing each instruction during a normal service; $N_{instruction\ line}$ represents a line number of instructions in a program; and $T_{peripheral\ access\ time}$ represents time of input/output operation in the program in the worst case.

To reduce the misjudgement probability on the crash abnormality of the network processor, the period of the timer cannot be set too short. Meanwhile, to guarantee the detection sensitivity of the crash abnormality for the system, in the disclosure, the period of the timer, $T_{timer\ period}$, is greater than or equal to the maximum value computed in each thread so as to make sure no misdetection for the crash abnormality.

According to the method and the system for detecting an abnormality of the network processor provided by the disclosure, the abnormality of a thread can be detected timely and efficiently according to the characteristics of the software flow of the network processor and the thread is recovered automatically after the abnormality is detected. The failure detection and repair capabilities of the network device using the network processor as a core unit at run time are greatly improved without influencing the forwarding performance and service processing flow of the network processor, therefore, the economic benefit of enterprises can be increased remarkably. In addition, to reduce the influence on the system performance due to the operation of the shared memory as much as possible, a shared memory with a higher input/output speed is adopted in the disclosure in combination with the system hardware solution.

At last, it should be noted that the above are the embodiments of the disclosure, and indeed, changes and modifications can be made by those skilled in the art and shall be the protection scope of the disclosure if pertaining to the technical scope of the claims and equivalents thereof.

What is claimed is:

1. A method for detecting an abnormality of a network processor, comprising:
    adding an abnormality detection operation code into an execution flow of each thread in a network processor, and setting a flag bit corresponding to a current thread in an abnormality protection flag data area in a shared memory to a first flag by the network processor when executing the abnormality detection operation code in the current thread; and
    when a period of a timer is expired, detecting, by a coprocessor, all the flag bits in the abnormality protection flag data area in the shared memory, determining that a thread corresponding to a flag bit which is not the first flag is abnormal when detecting that not all the flag bits are the first flag, and setting all the flag bits to a second flag when detecting that all the flag bits are the first flag.

2. The method according to claim 1, wherein the step of adding an abnormality detection operation code into an execution flow of each thread in a network processor comprises: adding the abnormality detection operation code into a public flow of the execution flow of each thread in the network processor; or, adding the abnormality detection operation code into a branch flow of the execution flow of each thread in the network processor.

3. The method according to claim 1, wherein the network processor is a single core network processor, and the step of setting a flag bit corresponding to a current thread in an abnormality protection flag data area in a shared memory to a first flag by the network processor when executing the abnormality detection operation code in the current thread comprises:
    reading, by the network processor, a status register in the network processor and extracting a thread number of the current thread when executing the abnormality detection operation code in the current thread;
    computing, by the network processor, a flag bit corresponding to the current thread according to the thread number of the current thread and a start address of the abnormality protection flag data area in the shared memory; and
    setting, by the network processor, the flag bit corresponding to the current thread to the first flag.

4. The method according to claim 1, wherein the network processor is a multi-core network processor, and the step of setting a flag bit corresponding to a current thread in an abnormality protection flag data area in a shared memory to a first flag by the network processor when executing the abnormality detection operation code in the current thread comprises:
    reading, by the network processor, a status register in the network processor and extracting a core number of the processor of the current thread and a thread number of the current thread when executing the abnormality detection operation code in the current thread;
    computing, by the network processor, a serial number of the current thread of all the threads in the network processor according to the core number of the processor and the thread number of the current thread;
    computing, by the network processor, a flag bit corresponding to the current thread according to the serial number of the current thread of all the threads in the network processor and a start address of the abnormality protection flag data area in the shared memory; and
    setting, by the network processor, the flag bit corresponding to the current thread to the first flag.

5. The method according to claim 1, wherein setting the period of the timer, $T_{timer\ period}$, according to a following formula:

$$T_{timer\ period} >= \max[1/f_{network\ processor\ frequency} * T_{average\ instruction\ period} * N_{instruction\ line} + T_{peripheral\ access\ time}]$$

where $f_{network\ processor\ frequency}$ represents frequency of the network processor during a normal service; $T_{average\ instruction\ period}$ represents an average period of the network processor executing each instruction during a normal service; $N_{instruction\ line}$ represents a line number of instructions in a program; and $T_{peripheral\ access\ time}$ represents time of input/output operation in the program in a worst case.

6. The method according to claim 2, wherein the network processor is a single core network processor, and the step of setting a flag bit corresponding to a current thread in an abnormality protection flag data area in a shared memory to a first flag by the network processor when executing the abnormality detection operation code in the current thread comprises:

reading, by the network processor, a status register in the network processor and extracting a thread number of the current thread when executing the abnormality detection operation code in the current thread;

computing, by the network processor, a flag bit corresponding to the current thread according to the thread number of the current thread and a start address of the abnormality protection flag data area in the shared memory; and setting, by the network processor, the flag bit corresponding to the current thread to the first flag.

7. The method according to claim 2, wherein the network processor is a multi-core network processor, and the step of setting a flag bit corresponding to a current thread in an abnormality protection flag data area in a shared memory to a first flag by the network processor when executing the abnormality detection operation code in the current thread comprises:

reading, by the network processor, a status register in the network processor and extracting a core number of the processor of the current thread and a thread number of the current thread when executing the abnormality detection operation code in the current thread;

computing, by the network processor, a serial number of the current thread of all the threads in the network processor according to the core number of the processor and the thread number of the current thread;

computing, by the network processor, a flag bit corresponding to the current thread according to the serial number of the current thread of all the threads in the network processor and a start address of the abnormality protection flag data area in the shared memory; and setting, by the network processor, the flag bit corresponding to the current thread to the first flag.

8. The method according to claim 2, wherein setting the period of the timer, $T_{timer\ period}$, according to a following formula:

$$T_{timer\ period} >= \max[1/f_{network\ processor\ frequency} * T_{average\ instruction\ period} * N_{instruction\ line} + T_{peripheral\ access\ time}]$$

where $f_{network\ processor\ frequency}$ represents frequency of the network processor during a normal service; $T_{average\ instruction\ period}$ represents an average period of the network processor executing each instruction during a normal service; $N_{instruction\ line}$ represents a line number of instructions in a program; and $T_{peripheral\ access\ time}$ represents time of input/output operation in the program in a worst case.

9. A system for detecting an abnormality of a network processor, comprising a network processor, a coprocessor and a shared memory, wherein:

the network processor, into an execution flow of each thread of which an abnormality detection operation code is added, is configured to set a flag bit corresponding to a current thread in an abnormality protection flag data area in the shared memory to a first flag when executing the abnormality detection operation code in the current thread;

the coprocessor is configured to, when a period of a timer is expired, detect all the flag bits in the abnormality protection flag data area in the shared memory, determine that a thread corresponding to a flag bit which is not the first flag is abnormal when detecting that not all the flag bits are the first flag, and set all the flag bits to a second flag when detecting that all the flag bits are the first flag; and the shared memory is configured to store data written by the network processor and the coprocessor for access of the coprocessor.

10. The system according to claim 9, wherein the abnormality detection operation code is added into a public flow of the execution flow of each thread in the network processor; or, the abnormality detection operation code is added into a branch flow of the execution flow of each thread in the network processor.

11. The system according to claim 9, wherein the network processor is a single core network processor, which comprises:

a first reading module, which is configured to read a status register in the network processor and extract a thread number of the current thread when executing the abnormality detection operation code in the current thread;

a first computation module, which is configured to compute a flag bit corresponding to the current thread according to the thread number of the current thread and a start address of the abnormality protection flag data area in the shared memory; and a first writing module, which is configured to set the flag bit corresponding to the current thread to the first flag.

12. The system according to claim 9, wherein the network processor is a multi-core network processor, which comprises:

a second reading module, which is configured to read a status register in the network processor and extract a core number of the processor of the current thread and a thread number of the current thread when executing the abnormality detection operation code in the current thread;

a second computation module, which is configured to compute a serial number of the current thread of all the threads in the network processor according to the core number of the processor and the thread number of the current thread;

a third computation module, which is configured to compute a flag bit corresponding to the current thread according to the serial number of the current thread of all the threads in the network processor and a start address of the abnormality protection flag data area in the shared memory; and a second writing module, which is configured to set the flag bit corresponding to the current thread to the first flag.

13. The system according to claim 9, wherein the period of the timer, $T_{timer\ period}$, is set according to a following formula:

$$T_{timer\ period} >= \max[1/f_{network\ processor\ frequency} * T_{average\ instruction\ period} * N_{instruction\ line} + T_{peripheral\ access\ time}]$$

where $f_{network\ processor\ frequency}$ represents frequency of the network processor during a normal service; $T_{average\ instruction\ period}$ represents an average period of the network processor executing each instruction during a normal service; $N_{instruction\ line}$ represents a line number of instructions in a program; and $T_{peripheral\ access\ time}$ represents time of input/output operation in the program in a worst case.

14. The system according to claim 10, wherein the network processor is a single core network processor, which comprises:

a first reading module, which is configured to read a status register in the network processor and extract a thread number of the current thread when executing the abnormality detection operation code in the current thread;

a first computation module, which is configured to compute a flag bit corresponding to the current thread according to the thread number of the current thread and a start address of the abnormality protection flag data area in the shared memory; and a first writing module, which is configured to set the flag bit corresponding to the current thread to the first flag.

15. The system according to claim 10, wherein the network processor is a multi-core network processor, which comprises:

a second reading module, which is configured to read a status register in the network processor and extract a core number of the processor of the current thread and a thread number of the current thread when executing the abnormality detection operation code in the current thread;

a second computation module, which is configured to compute a serial number of the current thread of all the threads in the network processor according to the core number of the processor and the thread number of the current thread;

a third computation module, which is configured to compute a flag bit corresponding to the current thread according to the serial number of the current thread of all the threads in the network processor and a start address of the abnormality protection flag data area in the shared memory; and a second writing module, which is configured to set the flag bit corresponding to the current thread to the first flag.

16. The system according to claim 10, wherein the period of the timer, $T_{timer\ period}$, is set according to a following formula:

$$T_{timer\ period} >= \max[1/f_{network\ processor\ frequency} * T_{average\ instruction\ period} * N_{instruction\ line} + T_{peripheral\ access\ time}]$$

where $f_{network\ processor\ frequency}$ represents frequency of the network processor during a normal service; $T_{average\ instruction\ period}$ represents an average period of the network processor executing each instruction during a normal service; $N_{instruction\ line}$ represents a line number of instructions in a program; and $T_{peripheral\ access\ time}$ represents time of input/output operation in the program in a worst case.

* * * * *